US006633460B2

(12) United States Patent
Takeya

(10) Patent No.: US 6,633,460 B2
(45) Date of Patent: Oct. 14, 2003

(54) THIN-FILM MAGNETIC HEAD HAVING ADJUSTED MAGNETOSTRICTION

(75) Inventor: Tsutomu Takeya, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 126 days.

(21) Appl. No.: 09/938,044

(22) Filed: Aug. 23, 2001

(65) Prior Publication Data

US 2002/0039262 A1 Apr. 4, 2002

(30) Foreign Application Priority Data

Aug. 25, 2000 (JP) ....................................... 2000-256412

(51) Int. Cl.[7] .................................................. G11B 5/39
(52) U.S. Cl. ....................................... 360/313; 428/692
(58) Field of Search ................................ 360/313, 316, 360/327, 324, 324.1, 324.11, 324.12, 324.2; 428/692

(56) References Cited

U.S. PATENT DOCUMENTS 5,208,715 A 5/1993 Mowry
5,609,971 A * 3/1997 Matono et al. ............. 428/692
5,731,936 A * 3/1998 Lee et al. .............. 360/327.22
6,031,692 A 2/2000 Kawawake et al.
6,088,204 A * 7/2000 Farrow et al. .............. 360/327
6,153,319 A * 11/2000 Hasegawa ................... 428/692
6,198,610 B1 3/2001 Kawawake et al.

* cited by examiner

*Primary Examiner*—David L. Ometz
(74) *Attorney, Agent, or Firm*—Brinks Hofer Gilson & Lione

(57) ABSTRACT

A magnetic head is provided that has a smaller amount of change in asymmetry with respect to the MR height, and has an improved resolution for a reproduction signal. In a magnetic head including a magnetoresistive device as a read device for reading magnetic recording information recorded on a magnetic recording medium, the magnetostriction constant of a soft magnetic substance forming the magnetoresistive device is 0 or below. Since the magnetostriction constant of the magnetoresistive device is 0 or below, the amount of change in asymmetry with respect to the MR height is reduced. Therefore, even when the MR height is slightly changed, the asymmetry does not vary significantly.

12 Claims, 12 Drawing Sheets

Y X Z Tw 6 20 h 21 21 16 16

ASYMMETRY VARIATION RATIO
PEAK HEIGHT (Taa)
ASYMMETRY VARIATION RATIO ( Δsym/h (%/μm) )
PEAK HEIGHT, Taa (%)
MAGNETOSTRICTION CONSTANT, λ (×10$^{-6}$)

18a
WG
14
13'
20
13
3
15
17
16
18
12
18b
19
16
17
10
11
Y
X
Z

MAGNETOSTRICTION CONSTANT, λ (×10-6)
1.5
1
0.5
0
-0.5
-1
-1.5
-2
-2.5
-3
-3.5
17
17.5
18
18.5
18.8
19
19.5
20
Fe COMPOSITION RATIO (WEIGHT %)

THIN-FILM MAGNETIC HEAD HAVING ADJUSTED MAGNETOSTRICTION

BACKGROUND OF THE INVENTION

1. Field of the Invention

The present invention relates to a magnetic head employing a magnetoresistive device, and more particularly to a technique for providing a magnetic head that has a reduced amount of change in asymmetry with respect to the MR height, and that exhibits better reproduction characteristics 2. Description of the Related Art In magnetic heads for use in VCRs, data storage units of computers, etc., the track width has been narrowed in recent years as a result of an increase in recording density and conversion into a digital form of signal recording.

Against such a background, various MIG (Metal In Gap) magnetic heads have hitherto been employed. An MIG magnetic head has a structure with a pair of magnetic core halves, each of which is fabricated by forming, on a core half made of ferrite or ceramic, a metal magnetic thin film having superior soft magnetic characteristics. The core halves are joined to each other by a bonding material, such as a fusing glass, with an insulating film interposed between the magnetic core halves.

Recently, in an attempt to obtain narrower tracks than those possible in MIG magnetic heads, efforts have been made to apply a magnetic head utilizing a magnetoresistive device (MR device) as a device for reproducing magnetic recording information in VCRs, data storage units, etc.

FIG. 13 shows the sectional structure of a principal part of a conventional magnetic head. This magnetic head comprises two half cores, an MR head section for reproduction, and a write head section for recording, both of the head sections being formed between the half cores.

As shown in FIG. 13, an MR head section 110 for reproduction is formed on an insulating layer 104 that is formed on an end surface 103*a* of one half core 103. The MR head section 110 is made up of a lower shield layer 112 and a lower insulating layer 113, which are successively formed on the insulating layer 104 in that order, a magnetoresistive device (hereinafter referred to as an "MR device") 120 is formed on the lower insulating layer 113 and is exposed to a medium sliding surface 102. An upper insulating layer 114 covers the MR device 120, and an upper shield layer 115 is formed on the upper insulating layer 114. The upper shield layer 115 also serves as a lower core layer for a write head section 111 described below.

The write head section 111 is made up of a lower core layer (upper shield layer) 115, a gap layer 116 and a coil 117, which are successively formed on the lower core layer 115 in that order, an upper insulating layer 118 covering the coil 117, and an upper core layer 119 joined at one end to the gap layer 116 and at the other end to the lower core layer 115 on the side of the coil 117.

More specifically, a base end 119*b* of the upper core layer 119 is magnetically coupled to the lower core layer 115 in a substantially central portion of the coil 117. A core protective layer 130 made of, e.g., alumina, is formed on the upper core layer 119, and the other half core (not shown) is joined to the core protective layer 130 from above.

The MR device 120 is formed of a thin film of a soft magnetic alloy such as a Ni—Fe alloy, and is connected to an MR electrode 121. The MR device 120 is also exposed at its part to the medium sliding surface 102, and has the MR height h of a predetermined dimension in a direction perpendicular to the medium sliding surface 102 (i.e., in a direction of arrow Z shown in FIG. 13).

As will be described later, the dimension of the MR height h of the MR device 120 gives an important effect upon reproduction characteristics of the MR head section 110, and therefore the dimensional accuracy of the MR height h must be closely managed. Usually, the MR height h is adjusted by polishing the medium sliding surface 102.

A Ni—Fe alloy film has hitherto been used in the MR device 120, and it is known that the magnitude of a reproduction output from the MR head section 110 depends upon the magnetostriction constant of the Ni—Fe alloy film. In a conventional magnetic head, therefore, a Ni—Fe alloy film with the magnetostriction constant having a positive value is used to increase the reproduction output. In order to make positive the magnetostriction constant of the Ni—Fe alloy film, the composition ratio of Fe must not be lower than 19% by weight.

For the above-mentioned reason, most of MR devices used in conventional magnetic heads are formed of Ni—Fe alloys in which the composition ratio of Fe is not lower than 19% by weight.

On the other hand, in the case of employing a digital magnetic recording method, the symmetry in peak heights of a reproduction signal obtained by a magnetic head, i.e., the so-called asymmetry, occurs as a problem to be considered in addition to the magnitude of the reproduction output. The reproduction signal in a digital magnetic recording shows a waveform defined by a series of successive pulse waveforms that are reversed alternately in the positive and negative directions. If the symmetry in peak heights of successive pulse waveforms reversed alternately in the positive and negative directions is deteriorated, read errors may be increased.

Preventing the occurrence of read errors requires a reproduction signal having good symmetry, that is, by reducing the asymmetry of a magnetic head to 0%. The asymmetry of a magnetic head depends upon the MR height h of the MR device 120.

Although the MR height h is adjusted by polishing the medium sliding surface 102, the polishing accuracy is about 0.01 $\mu$m at a minimum and hence a variation in asymmetry may sometimes occur.

To suppress the variation in asymmetry, it is therefore necessary that the change in asymmetry be kept as small as possible, even with a change in the MR height h on the order of 0.01 $\mu$m.

Although a conventional magnetic head employing the MR device 120 whose magnetostriction constant has a positive value is superior in the reproduction output, it is disadvantageous in providing a larger amount of change in asymmetry with respect to the MR height h. An improvement in polishing accuracy of the MR height h should be effective in suppressing a variation in asymmetry. In the present state of the art, however, it is difficult to further improve the polishing accuracy of the MR height. Thus, the variation in asymmetry of the magnetic head cannot be suppressed to a satisfactory level.

Additionally, with an increase in magnetic recording density, an increased reproduction rate is demanded, and the use of higher frequencies to produce a recording magnetic field is likewise demanded. Precise reading of a recording magnetic field at higher frequencies requires a magnetic head having a higher resolution. However, the resolution of a conventional magnetic head is not sufficient for satisfying the above demand.

The inventors have made intensive studies with a view to overcoming the problems described above, and have found that there is a specific relationship between the asymmetry of a magnetic head and the magnetostriction constant of an MR device. Based on such a specific relationship, the inventors have accomplished the present invention.

SUMMARY OF THE INVENTION

In view of the state of the art described above, it is an object of the present invention to provide a magnetic head that has a smaller amount of change in asymmetry (i.e., symmetry in peak heights of a reproduction signal) with respect to the MR height, and has an improved resolution for the reproduction signal.

To achieve the above object, the present invention is constituted as follows.

According to one aspect of the present invention, there is provided a magnetic head including a magnetoresistive device as a read device for reading magnetic recording information recorded on a magnetic recording medium while contacting the magnetic recording medium, wherein a magnetostriction constant of a soft magnetic substance forming the magnetoresistive device is 0 or below.

With the magnetic head having the above feature, since the magnetostriction constant of the magnetoresistive device (hereinafter referred to as the "MR device") is 0 or below, the amount of change in asymmetry (i.e., symmetry in peak heights of a reproduction signal) with respect to the MR height is significantly reduced. Therefore, even when the MR height is slightly changed, the asymmetry does not vary significantly.

In the aforementioned magnetic head, the magnetostriction constant of the soft magnetic substance forming the MR device is preferably in a range of not less than $-3\times10^{-6}$ and not more than 0.

When the magnetostriction constant of the MR device is not less than $-3\times10^{-6}$, the reproduction output of the magnetic head is prevented from lowering excessively. When the magnetostriction constant of the MR device is not more than 0, the amount of change in asymmetry with respect to the MR height is reduced, and the asymmetry does not vary significantly, even with a slight change in the MR height.

In the aforementioned magnetic head, the soft magnetic substance forming the MR device is preferably a Ni—Fe alloy, and the composition ratio of Fe in the Ni—Fe alloy is in a range of not smaller than 17.5% by weight, but not larger than 18.8% by weight.

In the magnetic head having the above features, by employing a Ni—Fe alloy having the Fe composition ratio of not smaller than 17.5% by weight, but not larger than 18.8% by weight, as the soft magnetic substance forming the MR device, the magnetostriction constant of the MR device can be maintained in the range of not less than $-3\times10^{-6}$ and not more than 0. As a result, the reproduction output of the magnetic head is prevented from lowering excessively, and the asymmetry does not vary significantly, even with a slight change in the MR height.

In the aforementioned magnetic head, the magnetostriction constant of the soft magnetic substance forming the MR device is preferably in a range of not less than $-3\times10^{-6}$ and not more than $-0.5\times10^{-6}$.

When the magnetostriction constant of the MR device is not less than $-3\times10^{-6}$, the reproduction output of the magnetic head is prevented from lowering excessively. When the magnetostriction constant of the MR device is not more than $-0.5\times10^{-6}$, the resolution in detecting a recording signal on the magnetic recording medium is improved so as to be adaptable for a higher frequency of the recording signal.

In the aforementioned magnetic head, the soft magnetic substance forming the MR device is preferably a Ni—Fe alloy, and a composition ratio of Fe in the Ni—Fe alloy is in a range of not smaller than 17.5% by weight and not larger than 18.5% by weight.

In the magnetic head having the above features, by employing a Ni—Fe alloy having the Fe composition ratio of not smaller than 17.5% by weight and not larger than 18.5% by weight as the soft magnetic substance forming the MR device, the magnetostriction constant of the MR device can be maintained in the range of not less than $-3\times10^{-6}$ and not more than $-0.5\times10^{-6}$. As a result, the reproduction output of the magnetic head is prevented from lowering excessively, and the resolution in detecting a recording signal on the magnetic recording medium is improved so as to be adaptable for a higher frequency of a reproduction signal. According to another aspect of the present invention, there is provided a magnetic head including two or more magnetoresistive (MR) devices as read devices for reading magnetic recording information recorded on a magnetic recording medium while contacting the magnetic recording medium, wherein a magnetostriction constant of a soft magnetic substance forming each of the magnetoresistive devices is 0 or below.

In the magnetic head having the above features, the magnetostriction constant of each MR device is 0 or below, and the amount of change in asymmetry (i.e., symmetry in peak heights of a reproduction waveform) with respect to the MR height is thereby reduced. Therefore, even when a slight variation in the MR height occurs among the MR devices, the asymmetry does not vary significantly in the entire magnetic head.

In the aforementioned magnetic head, the magnetostriction constant of the soft magnetic substance forming each MR device is preferably in a range of not less than $-3\times10^{-6}$ and not more than 0.

In the aforementioned magnetic head, the magnetostriction constant of the soft magnetic substance forming each MR device is preferably in a range of not less than $-3\times10^{-6}$ and not more than $-0.5\times10^{-6}$.

Furthermore, in a magnetic head having a plurality of MR devices, the rate of acceptable final products manufactured is given by multiplying the rates of acceptable respective MR devices by one another. Accordingly, the rate of acceptable final products tends to be reduced to a large extent as the number of MR devices per head increases. By employing the above construction, however, the rate of acceptable final products can be remarkably improved when manufacturing a magnetic head including a plurality of MR devices.

DESCRIPTION OF THE PREFERRED EMBODIMENTS

Embodiments of the present invention will be described below with reference to the drawings. It is to be noted that the present invention is not limited to the following embodiments.

Figure 1:
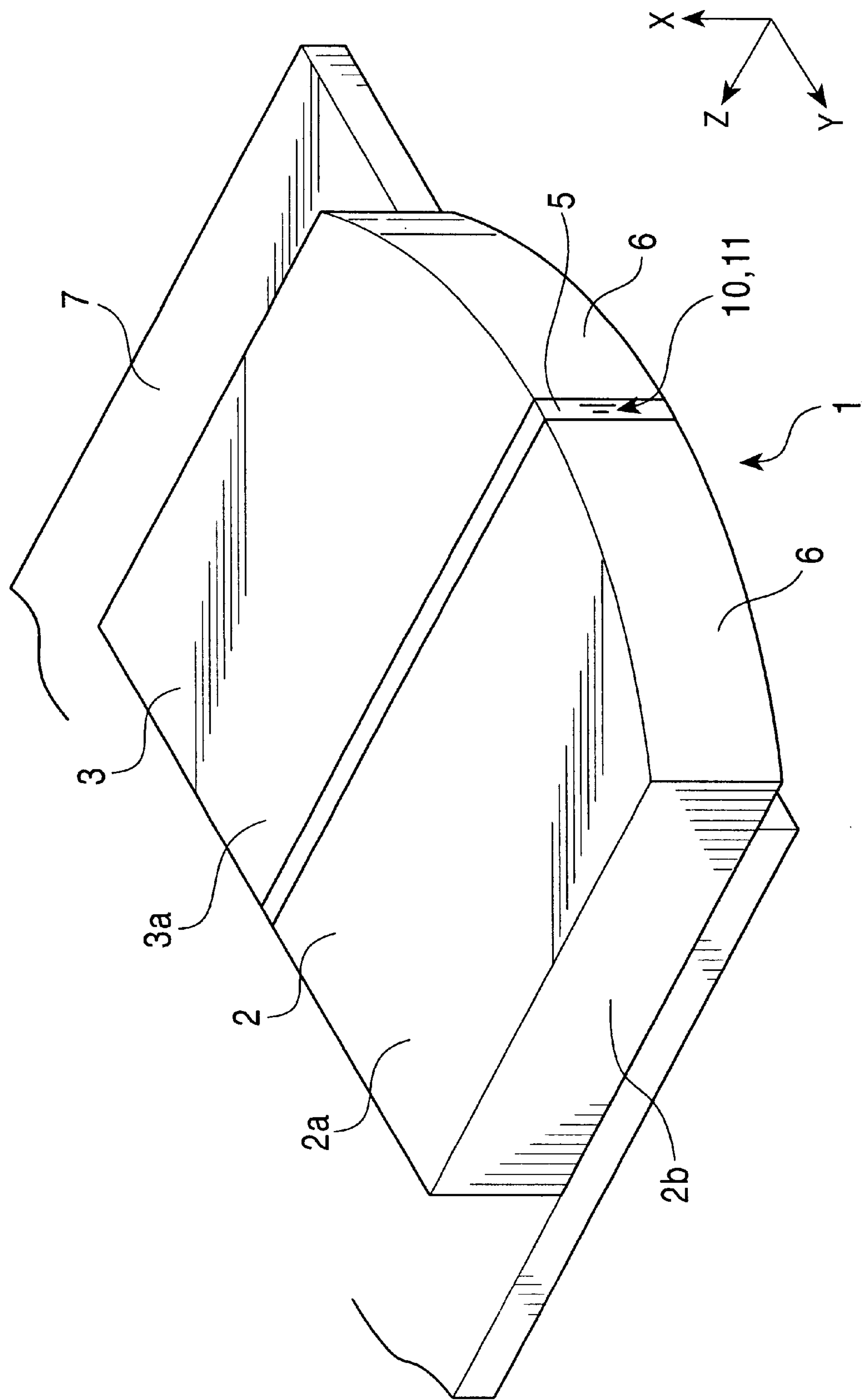
FIG. 1 is a perspective view of a magnetic head according to one embodiment of the present invention.

FIG. 1 shows a condition in which a magnetic head 1 according to one embodiment of the present invention is mounted on a base plate 7 of a rotary cylinder of a magnetic recording apparatus such as a VCR.

The magnetic head 1 is in the form of a flat plate as a whole and comprises a pair of plate-like core halves 2, 3 which are bonded at their side end surfaces together with a core built-in layer 5 interposed between them. A side surface of each of the core halves 2, 3 having a larger area (i.e., bottom surfaces of the core halves 2, 3 each being laid sideways in FIG. 1) is fixedly bonded to an upper surface of the base plate 7 such that one side of each of the core halves 2, 3 is slightly projected from one end of the base plate 7.

These core halves 2, 3 are each made of ferrite or a ceramic material having superior wear resistance, such as $CaTiO_3$ and $Al_2O_3$+TiC.

One end surface of the magnetic head 1 projecting outwardly of the base plate 7 is machined to provide a medium sliding surface 6 in an elongated convexly curved form. More specifically, the medium sliding surface 6 is formed as a curved surface that is extended across a plane that includes side surfaces 2*a*, 3*a* having larger areas of the core halves 2, 3, which are positioned on the upper side because the magnetic head 1 is laid sideways in FIG. 1 (i.e., a curved surface extending in the sliding direction of a magnetic tape).

Figure 2:
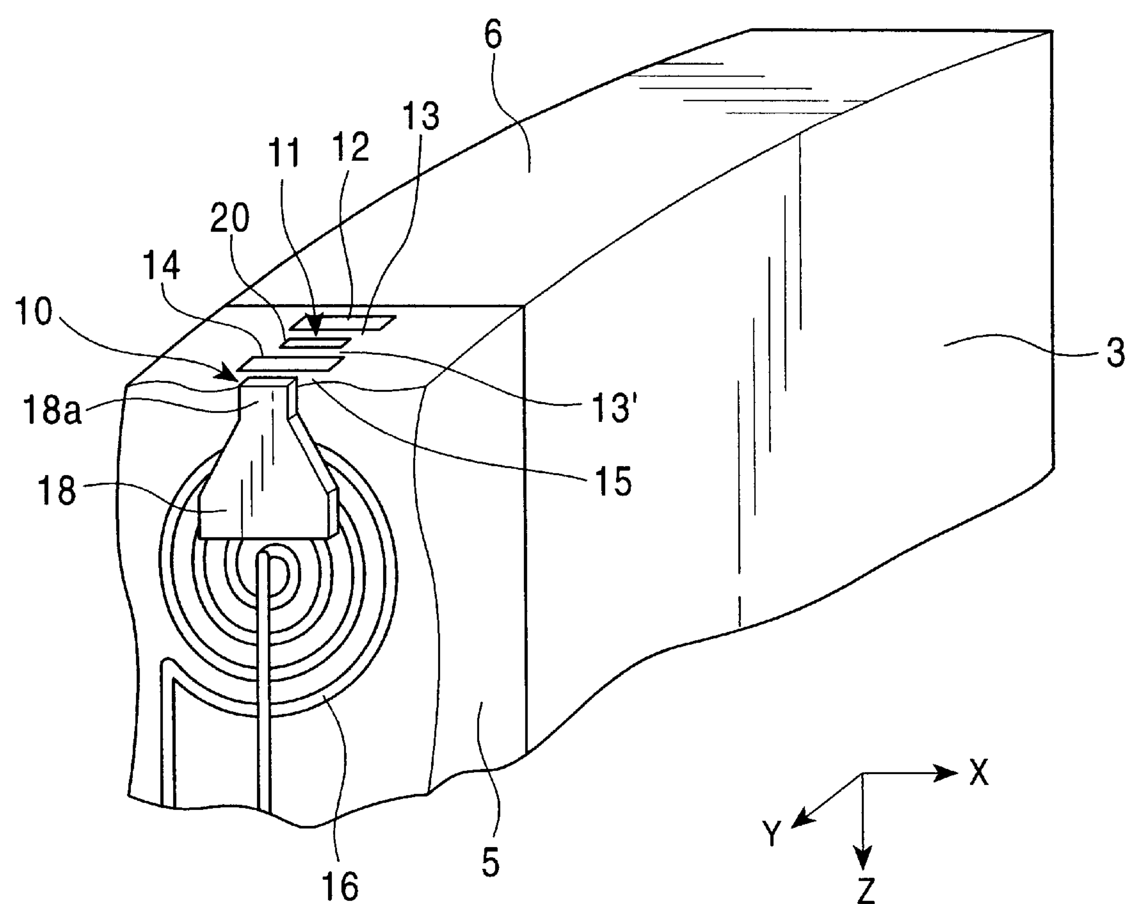
FIG. 2 is a perspective view in section showing a principal part of the magnetic head shown in FIG. 1.
Figure 3:
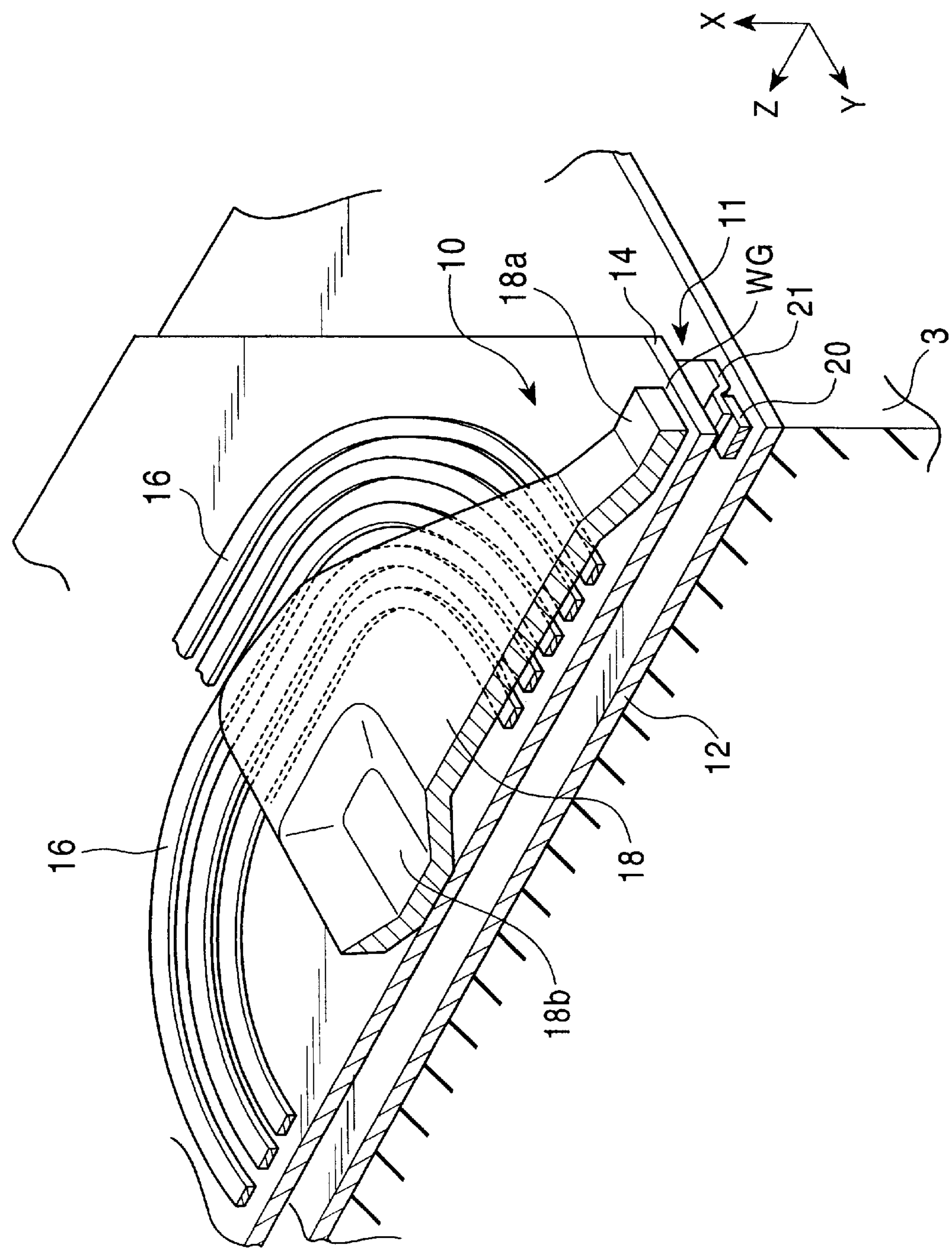
FIG. 3 is a perspective view in section showing a principal part of the magnetic head shown in FIG. 1.
Figure 4:
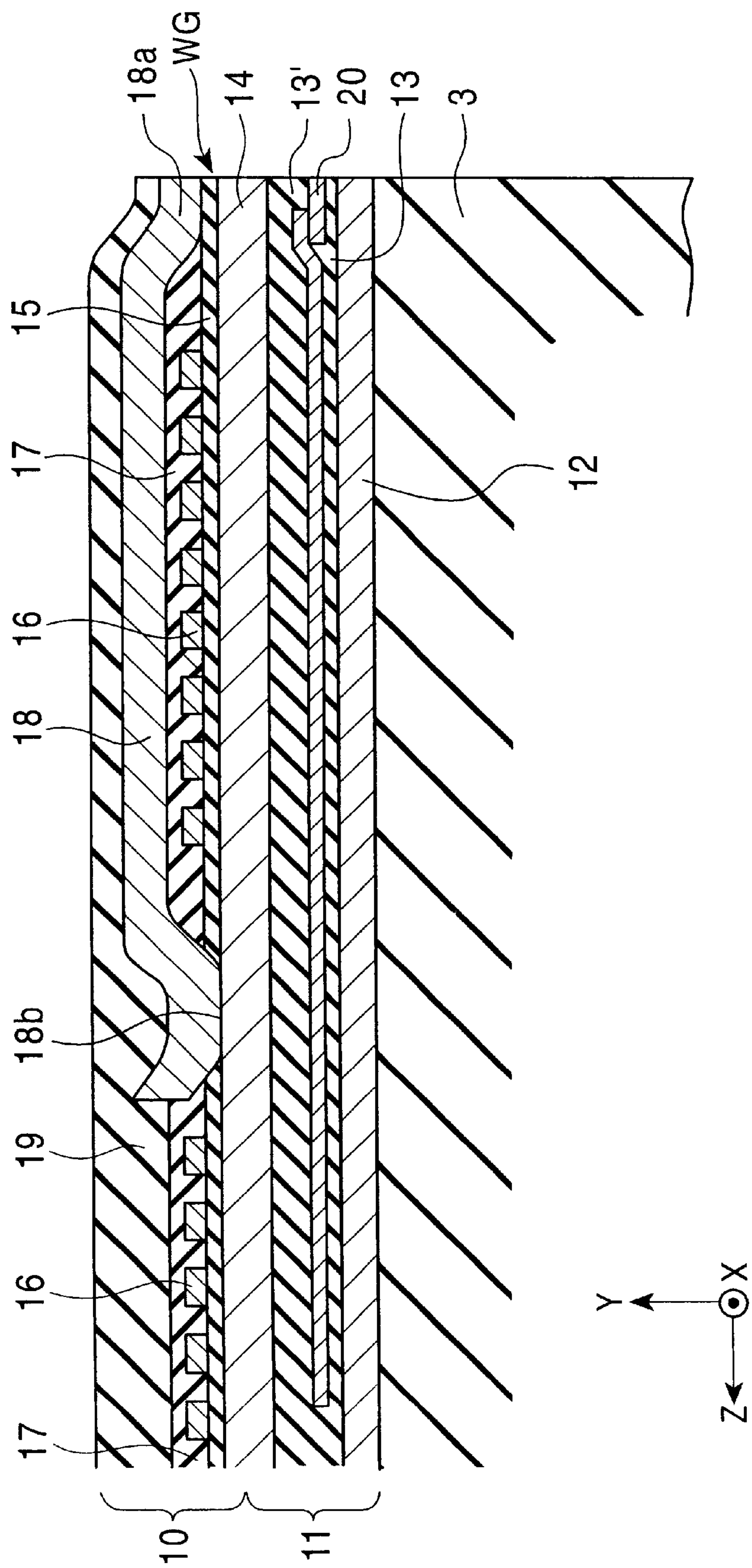
FIG. 4 is a sectional view showing a principal part of the magnetic head shown in FIG. 1.

A write head section 10 and an MR head section 11 are incorporated in the core built-in layer 5 disposed in a central portion of the medium sliding surface 6. The write head section 10 and the MR head section 11 are structured, by way of example, as shown in FIGS. 2 to 4.

Note that, in FIGS. 1 to 5, an X-direction represents the track width direction of the magnetic head, a Y-direction represents the gap length direction of the magnetic head (i.e., the moving direction of a magnetic recording medium), and a Z-direction represents the height direction of the magnetic head (i.e., the direction perpendicular to the medium sliding surface).

As detailed in FIGS. 2 to 4, the MR head section 11 is structured as follows. A gap layer 13 made of a non-magnetic material, such as alumina ($Al_2O_3$), is formed on a lower shield layer 12 made of a magnetic alloy, such as a Fe—Ni alloy, a Fe—Al—Si alloy or a Co-based amorphous alloy, and a magnetoresistive device (hereinafter referred to as an "MR device") 20 is embedded in the gap layer 13. Thereon, another gap layer 13' and an upper shield layer 14 are successively formed in that order. The upper shield layer 14 also serves as a lower core layer for the write head section 10 that is to be provided on it.

The write head section 10 is structured as follows. A gap layer 15 is formed on the upper shield layer (serving also as the lower core layer) 14, and a thin film coil portion 16 patterned into a two-dimensional annular and spiral pattern is formed on the gap layer 15. The thin film coil portion 16 is surrounded by an insulating material layer 17. A yoke portion 18 is constituted by an upper core layer formed on the insulating material layer 17 and has a magnetic-pole fore end 18*a* that is exposed to the medium sliding surface 6 in an opposing relation to the upper shield layer (serving also as the lower core layer) 14 with a small gap between them. More specifically, the yoke portion 18 is disposed such that its base end 18*b* is magnetically coupled to the upper shield layer (serving also as the lower core layer) 14 and its magnetic-pole fore end 18*a* is positioned on the side of the medium sliding surface 6. A magnetic gap WG for writing is formed between the magnetic-pole fore end 18*a* and a fore end of the upper shield layer 14, and is also exposed to the medium sliding surface 6. A protective layer 19 made of, e.g., alumina, is formed on the upper core layer 18, and the other core half 2 is joined to the protective layer 19. The magnetic head 1 is thus constructed.

The positional relationship between the thin film coil portion 16 of the write head section 10 and the medium sliding surface 6 is set, as shown in FIG. 2, such that the thin film coil portion 16 and the yoke portion 18 are arranged to extend along a plane substantially perpendicular to the medium sliding surface 6. The magnetic-pole fore end 18*a*, formed by a distal end of the yoke portion 18, is exposed to the medium sliding surface 6.

In the write head section 10, a recording current is applied to the thin film coil portion 16, whereupon the thin film coil portion 16 applies electromotive forces to a magnetic circuit comprising the yoke portion 18 and the upper shield layer 14. Then, a magnetic signal is recorded on a magnetic recording medium, such as a magnetic tape, which slides in contact with the medium sliding surface 6, due to a magnetic field that is leaked from the upper shield layer (serving also as the lower core layer) 14 and the magnetic-pole fore end 18*a* of the yoke portion 18 and is produced in an area of the magnetic gap WG.

The MR head section 11 is constructed by connecting an electrode layer 21 to the MR device 20 formed of a thin film of a soft magnetic substance. When a magnetic field leaked from a magnetic recording medium, such as a magnetic tape, acts on the MR device 20, to which a detecting current is supplied from the electrode layer 21, the MR device 20 exhibits a resistance change.

In the MR head section 11, because the electrical resistance of the MR device 20 changes depending upon the presence or absence of a magnetic field leaked from, e.g., a magnetic tape sliding in contact with the medium sliding surface 6, information magnetically recorded on, e.g., the magnetic tape, can be read by detecting the resistance change.

Figure 5:
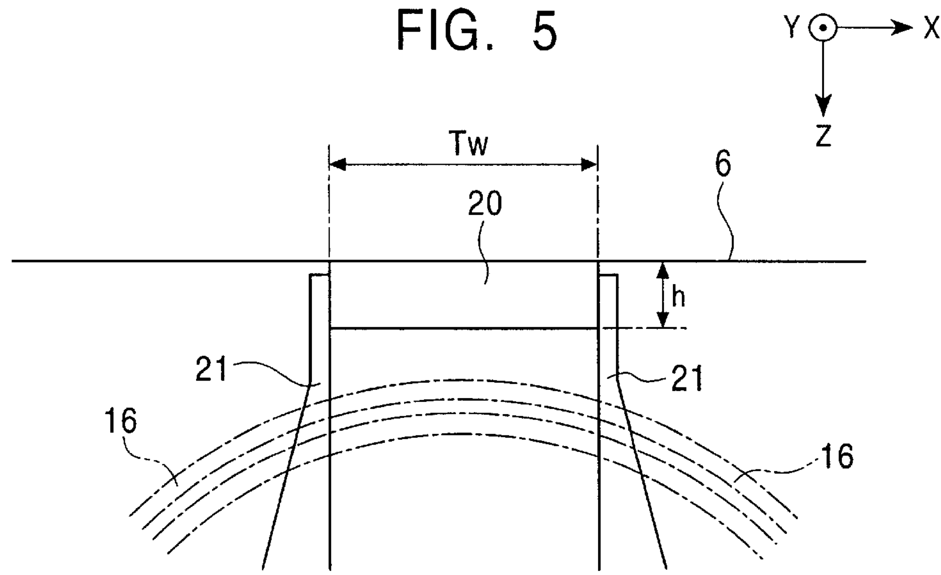
FIG. 5 is a schematic view showing a principal part of the magnetic head shown in FIG. 1, looking at a magnetoresistive device in a moving direction of a medium.

The positional relationship between the MR device 20 of the MR head section 11 and the medium sliding surface 6 is, as shown in FIG. 5, such that the MR device 20 is arranged to be exposed to the medium sliding surface 6. A pair of electrode layers 21, 21 are connected respectively to both ends of the MR device 20 in the track width direction (i.e., both ends thereof in the X-direction shown in FIG. 5), and are extended in the direction perpendicular to the medium sliding surface 6 (i.e., in the Z-direction shown in FIG. 5).

Further, the MR device 20 has a track width Tw in the track width direction and an MR height h in a direction perpendicular to the track width direction. Since the dimension of the MR height h gives an important effect upon reproduction characteristics of the MR head section 11, the dimensional accuracy of the MR height h must be closely managed. Usually, the MR height h is adjusted by polishing the medium sliding surface 6. The polishing accuracy varies by about 0.01 μm at a minimum, and hence the MR height h is also subjected to a variation on the order of 0.01 μm.

The MR device 20 for use in the present invention is formed of a thin film of a soft magnetic substance that is a Ni—Fe alloy. The magnetostriction constant of the MR device 20 is preferably 0 or below, more preferably not less than $-3\times10^{-6}$ and not more than 0, and most preferably not less than $-3\times10^{-6}$ and not more than $-0.5\times10^{-6}$.

The reasons why the magnetostriction constant of the MR device 20 should be limited to the above-mentioned range will be described below.

In the digital magnetic recording method, as described above, there occurs a problem of the symmetry in peak heights of a reproduction signal obtained by a magnetic head, i.e., the so-called asymmetry.

Figure 6:
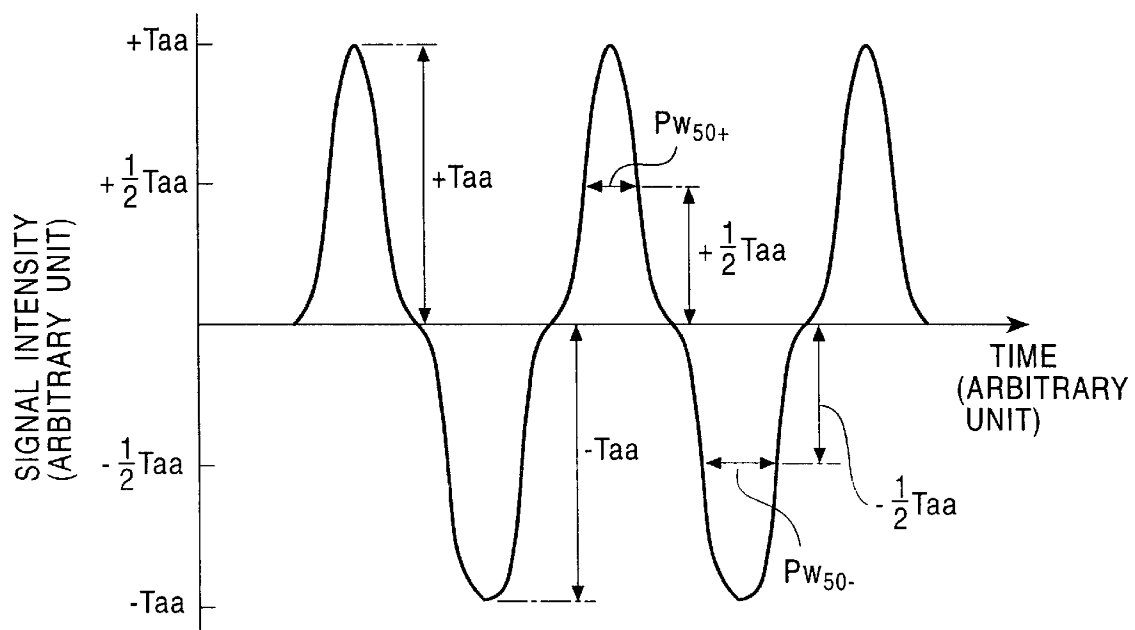
FIG. 6 is a chart showing one example of a reproduction signal obtained by the magnetic head reproducing a recording signal recorded in accordance with the digital magnetic recording method.

FIG. 6 shows one example of a reproduction signal generated in the digital magnetic recording method.

The reproduction signal shown in FIG. 6 has a waveform defined by a series of successive pulse waveforms that are alternately reversed in the positive and negative directions. The respective pulse waveforms have peak heights of ± Taa. The symmetry in peak heights (i.e., the asymmetry Asym (%)) of the reproduction signal, shown in FIG. 6, is expressed by the following formula (1):

$$Asym(\%) = \frac{(+Taa) - (-Taa)}{(+Taa) + (-Taa)} \times 100 \quad (1)$$

It is optimum that the asymmetry of the reproduction signal be 0%. If the asymmetry is 0%, the symmetry of the reproduction signal is improved and the occurrence of resultant drawbacks, such as read errors, is prevented.

An optimum value of the asymmetry can be determined by adjusting the MR height h of the MR device 20.

Because the MR height h is adjusted by polishing the medium sliding surface 6, a variation on the order of 0.01 μm at a minimum is inevitable in the MR height h among magnetic heads, and hence the asymmetry also varies corresponding to the variation in the MR height h. To obtain a stable asymmetry, therefore, it is preferable that the amount of change in asymmetry with respect to the MR height h be kept as small as possible.

In order to keep the amount of change in asymmetry with respect to the MR height h as small as possible, the magnetostriction constant of a soft magnetic substance, which is used to form the MR device 20, is preferably set to be 0 or below. By setting the magnetostriction constant of the MR device 20 to be 0 or below, an asymmetry variation ratio (ΔAsym/h(%/μm)) representing the amount of change in asymmetry per 1 μm of the MR height h can be held down to not more than 30 (%/μm). In other words, by setting the magnetostriction constant of the MR device 20 to be 0 or below, the amount of change in asymmetry with respect to the MR height h becomes very small, and in the production of the magnetic heads, the variation in asymmetry among the magnetic heads can be kept small. As a result, the reproduction characteristics of the magnetic heads can be stabilized.

Also, even when the medium sliding surface 6 is gradually worn off due to the sliding of a magnetic recording medium, such as a magnetic tape, against it, and the MR height h is varied correspondingly, the asymmetry of the magnetic head is not significantly altered and therefore can be maintained substantially constant at all times.

With a reduction in the magnetostriction constant of the MR device 20, an output reproduced by the magnetic head based on a recording magnetic field (external magnetic field) given from the magnetic recording medium is somewhat lowered, whereas the linearity of change in the reproduction output with respect to the external magnetic field is improved.

Figure 7:
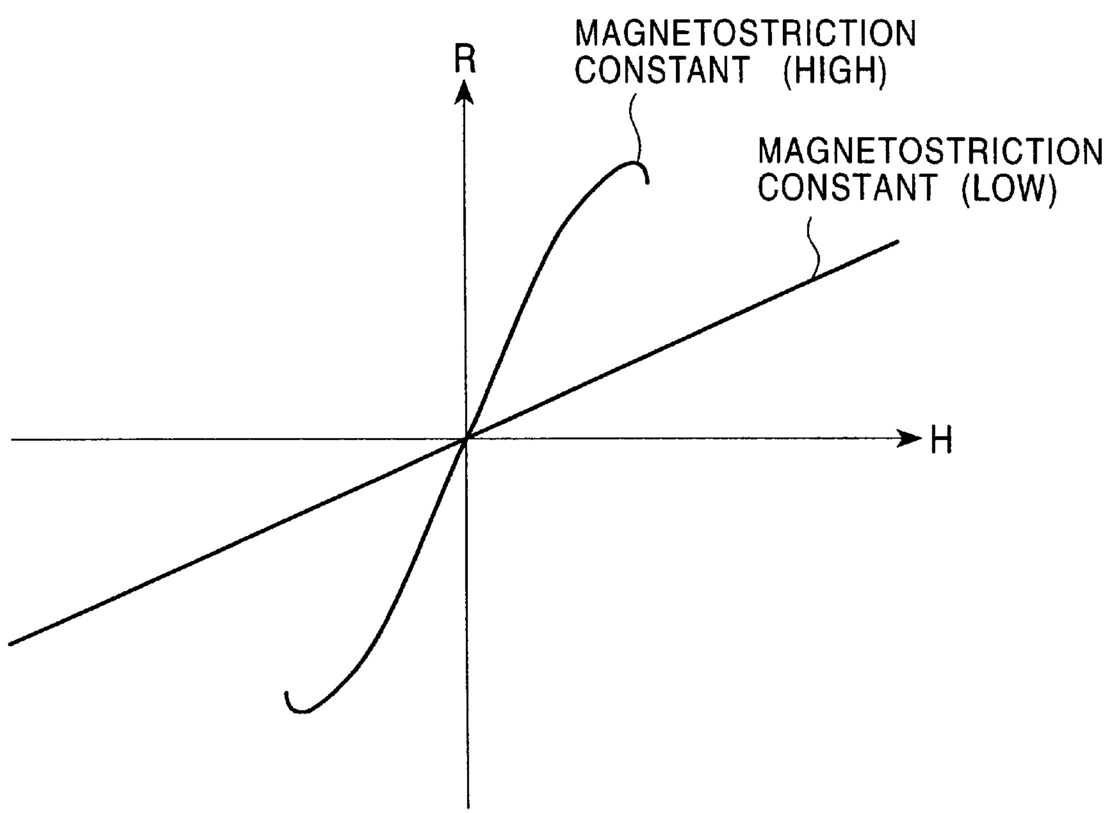
FIG. 7 is a graph showing one example of an RH curve of a magnetoresistive device for use in the present invention.

FIG. 7 shows a change of an RH curve depending upon the magnetostriction constant of an MR device. As can be seen from FIG. 7, when the magnetostriction constant of the MR device is low, the gradient of the RH curve is smaller, and the RH curve has a wider linear range with respect to the external magnetic field, than when the magnetostriction constant of the MR device is high.

Such a characteristic is advantageous in the magnetic head of the medium sliding type according to the present invention. More specifically, in the magnetic head of the medium sliding type, since the recording magnetic field (external magnetic field) given from the magnetic recording medium is relatively strong, a distortion of the reproduced waveform is reduced and the reproduction characteristics are improved as the RH curve has a wider linear range with respect to the external magnetic field.

In the magnetic head of the present invention, by setting the magnetostriction constant of the MR device 20 to be 0 or below, the linearity of change in the reproduction output with respect to the external magnetic field H can be obtained in a wider range while ensuring an appropriate level of the reproduction output.

However, if the magnetostriction constant is excessively lowered, an appropriate level of the reproduction output will not be obtained. The magnetostriction constant of the MR device 20 is therefore preferably not less than $-3\times10^{-6}$.

Furthermore, as the magnetostriction constant of the MR device 20 is reduced, the resolution in detecting a magnetic field recorded on the magnetic recording medium is improved. Assuming that the peak width at ½ of the peak height of each peak waveform is defined as a peak half-width ($Pw_{50\pm}$) in FIG. 6, a readable peak half-width ($Pw_{50\pm}$) is reduced with a reduction in the magnetostriction constant of the MR device 20. Stated otherwise, even when the peak width is reduced and the spacing between peaks is narrowed, a recording signal can be read in a satisfactory manner. As a result of this, the magnetostriction constant of the MR device 20 is preferably 0 or below.

In addition, when the magnetostriction constant of the MR device 20 is set to be not more than $0.7\times10^{-6}$, the difference between the peak half-width ($Pw_{50\pm}$) of the pulse waveform on the upper side and the peak half-width ($PW_{50\pm}$) of the pulse waveform on the lower side in FIG. 6 is reduced in the reading of the recording magnetic field. This improves the symmetry in peak half-widths of the upper and lower pulse waveforms.

Thus, a reduced magnetostriction of the MR device 20 makes it possible to read a smaller peak half-width ($Pw_{50\pm}$), improves the detecting resolution of the magnetic head so as to be adaptable for a higher frequency of a recording signal, and suppresses the occurrence of read errors.

The magnetostriction constant of the MR device 20 can be made 0 or below by setting the composition ratio of Fe in a Ni—Fe alloy to be 18.8% by weight or below. Also, it can be made not less than $-3\times10^{-6}$ and not more than 0 by setting the Fe composition ratio to be not smaller than 17.5% by weight and not larger than 18.8% by weight. Further, it can be made not less than $-3\times10^{-6}$ and not more than $-0.5\times10^{-6}$ by setting the Fe composition ratio to be not smaller than 17.5% by weight and not larger than 18.5% by weight.

The magnetic head of the present invention is not limited to the single channel type having one MR device as shown in FIGS. 1 to 5, but may include a plurality of MR devices.

Figure 8:
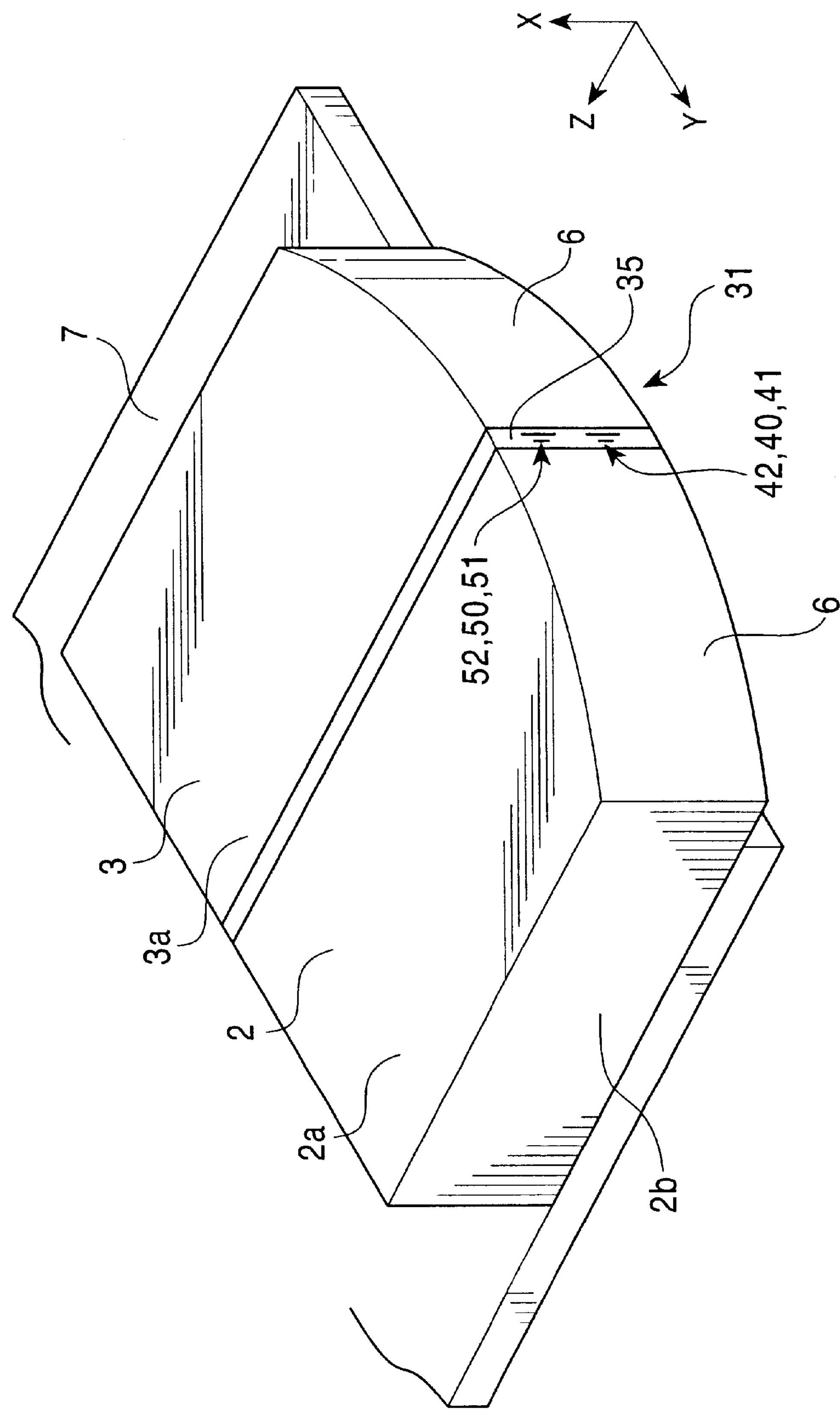
FIG. 8 is a perspective view of a magnetic head according to another embodiment of the present invention.
Figure 9:
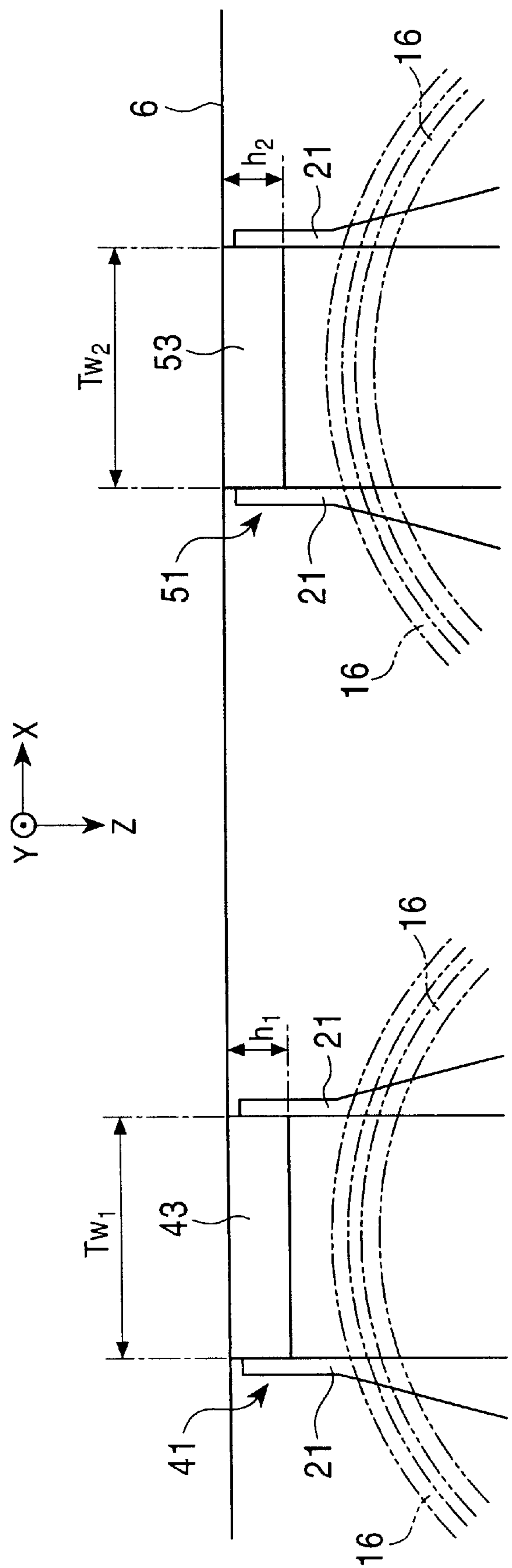
FIG. 9 is a schematic view showing a principal part of the magnetic head shown in FIG. 8, looking at a magnetoresistive device in the moving direction of the medium.

FIGS. 8 and 9 show one example of a magnetic head having a plurality of MR devices.

Note that in FIGS. 8 and 9, an X-direction represents the track width direction of the magnetic head, a Y-direction represents the gap length direction of the magnetic head (i.e., the moving direction of a magnetic recording medium), and a Z-direction represents the height direction of the magnetic head (i.e., the direction perpendicular to the medium sliding surface).

A magnetic head 31 of this embodiment includes two pairs of write head sections for writing and MR head sections for reading.

FIG. 8 shows a condition in which the magnetic head 31 is mounted on a base plate 7 of a rotary cylinder of a magnetic recording apparatus such as a VCR.

The magnetic head 31 is in the form of a flat plate, and comprises a pair of plate-like core halves 2, 3 that are bonded at their side end surfaces together with a core built-in layer 35 interposed between them. Materials of the core halves 2, 3 are the same as those used in the magnetic head 1 described above.

One end surface of the magnetic head 31 projecting outwardly from the base plate 7 is machined to provide a medium sliding surface 6 in an elongated convexly curved form. More specifically, the medium sliding surface 6 is formed as a curved surface that is extended across a plane that includes the side surfaces 2*a*, 3*a* having larger areas of the core halves 2, 3 (i.e., a curved surface extending in the sliding direction of a magnetic tape).

Write head sections 40, 50 and MR head sections 41, 51 are incorporated in the core built-in layer 35 disposed in a central portion of the medium sliding surface 6.

In the core built-in layer 35, the write head section 40 and the MR head section 41 are integrated to construct a first head section 42, and the write head section 50 and the MR head section 51 are integrated to construct a second head section 52.

The first and second head sections 42, 52 are arranged to lie in the track width direction (X-direction in FIG. 8).

The write head sections 40, 50 and the MR head sections 41, 51 have the same structures as those of the write head section 10 and the MR head section 11 shown in FIGS. 2 to 4, and therefore a description thereof has been omitted here.

FIG. 9 shows the sectional structure of the core built-in layer 35 of the magnetic head 31. As shown in FIG. 9, the MR head sections 41, 51 incorporated in the core built-in layer 35 are arranged to lie in the width direction of the medium sliding surface 6, i.e., in the track width direction (X-direction in FIG. 9) of the magnetic head 31. MR devices 43, 53, incorporated respectively in the MR head sections 41, 51, are exposed to the medium sliding surface 6, and a pair of electrode layers 21, 21 are connected respectively to both ends of each of the MR devices 43, 53 in the track width direction (X-direction in FIG. 9).

Also, the MR devices 43, 53 are each of the same configuration as the MR device 20 of the magnetic head 1 described above. In other words, the MR devices 43, 53 are each formed of a thin film of a Ni—Fe alloy which has the magnetostriction constant of 0 or below, and has an asymmetry variation ratio ($\Delta$Asym/h(%/$\mu$m)), representing the amount of change in asymmetry per 1 $\mu$m of the MR height h, of not more than 30 (%/$\mu$m).

Further, the MR devices 43, 53 have respective track widths $Tw_1$, $Tw_2$ in the track width direction, and respective MR heights $h_1$, $h_2$ perpendicular to the track width direction.

The MR heights $h_1$, $h_2$ give important effects upon the reproduction characteristics of the MR head sections 41, 51, and hence the dimensional accuracy thereof required to be closely managed. The MR heights $h_1$, $h_2$ are desirably the same so as to insure that the reproduction characteristics of the MR head sections 41, 51 are identical to each other. However, a minute difference of about 0.03 $\mu$m at a minimum may occur between the MR heights $h_1$ and $h_2$ due to the accuracy in polishing the medium sliding surface 6.

In such a case, as a result of a calculation based on the above-mentioned value representing the dependency of the asymmetry variation ratio upon the MR height, it is found that the asymmetry difference between the MR devices 43 and 53 is held to about 0.9%.

Therefore, with the magnetic head 31 of this embodiment, even when a minute difference occurs between the MR heights $h_1$ and $h_2$ of the MR devices 43, 53, the asymmetry difference between the MR devices 43 and 53 can be kept within about 0.9% because the amount of change in asymmetry with respect to the MR height is small.

Also, even when the medium sliding surface 6 is gradually worn off due to the sliding of a magnetic recording medium (such as a magnetic tape) against it, and the MR heights $h_1$, $h_2$ are unevenly reduced to cause a minute difference between them, any significant change in asymmetry between the MR devices 43 and 53 is not produced and the asymmetry can be maintained substantially constant at all times.

In the magnetic head 31 including a plurality of MR devices, a rate of acceptable final products manufactured as the magnetic heads 31 is given by multiplying a rate of acceptable MR devices 43 by a rate of acceptable MR devices 53. Accordingly, the rate of acceptable final products tends to be smaller in the case of manufacturing the magnetic head 31 than in the case of manufacturing the magnetic head 1 including only one MR device. With the magnetic head 31 having the above-described construction, the asymmetry difference is nevertheless kept small, and hence the rate of acceptable final products can be greatly increased.

EXAMPLE

The present invention will be described below in more detail in connection with an Example.

A lower shield layer and a gap layer were successively formed on one core half made of $Al_2O_3$+TiC in that order. An MR device formed of a Ni—Fe alloy film having one of various compositions was formed on the gap layer, and an electrode layer was then formed. Another gap layer was formed on the MR device and the electrode layer, and an upper shield layer was formed on that gap layer. An MR head section was thereby formed.

Subsequently, a gap layer, a thin-film coil portion, a yoke portion, and a protective layer were successively formed on the upper shield layer in that order, whereby a write head section was formed.

After that, the other core half was joined onto the protective layer, and the medium sliding surface was finally formed by polishing. In this way, a magnetic head of the type shown in FIGS. 1 to 5 was manufactured.

The compositions of the Ni—Fe alloy film used to form the MR device were selected such that the composition ratio of Fe varied in the range of from 16.7% to 19.6% by weight. Corresponding to that range of the Fe composition ratio, the magnetostriction constant of the MR device was varied in the range of from $-4\times10^{-6}$ to $1.2\times10^{-6}$.

Figure 10:
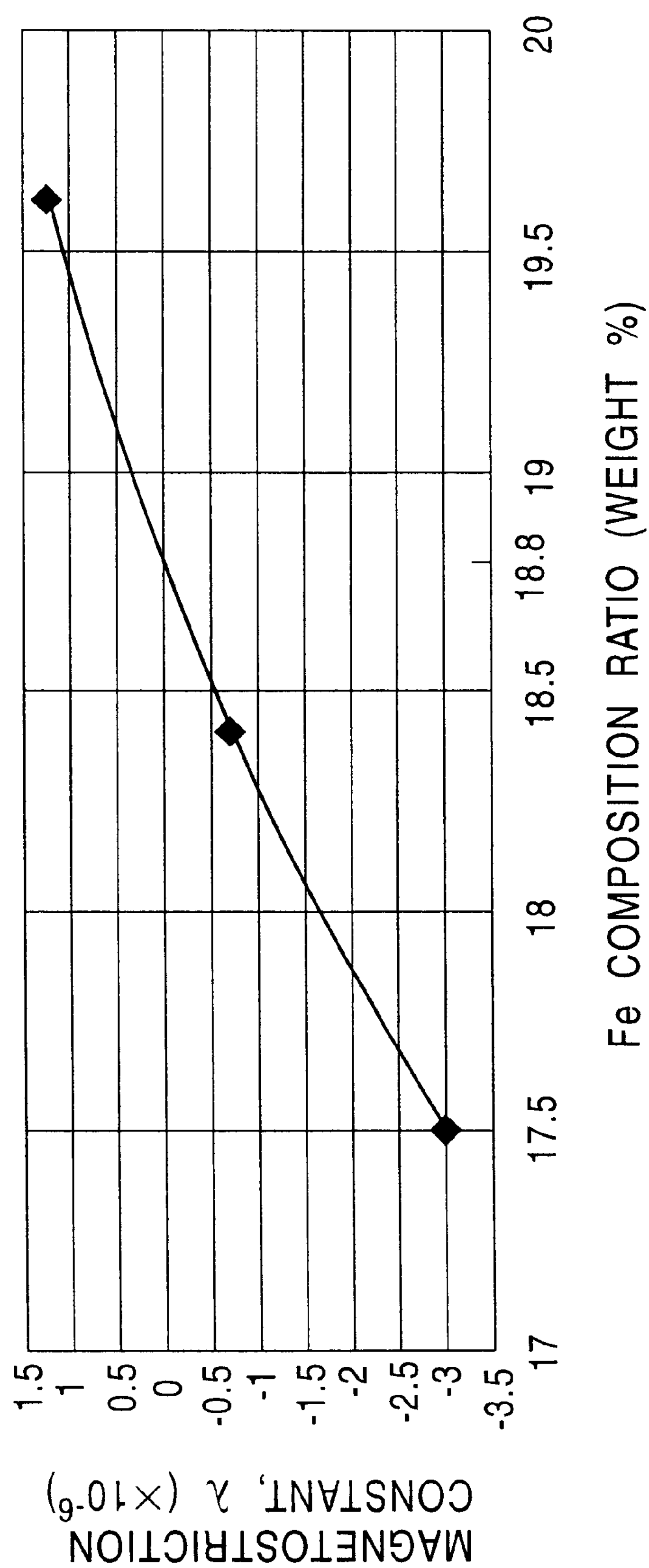
FIG. 10 is a graph showing the relationship between the composition ratio of Fe in a Ni—Fe alloy used to form a magnetoresistive device and the magnetostriction constant.

FIG. 10 shows the relationship between the composition ratio of Fe in the Ni—Fe alloy and the magnetostriction constant.

By reading a recording magnetic field recorded in the digital form on a magnetic recording medium with a variety of the manufactured magnetic heads, the peak height (±Taa) of the pulse waveform of a reproduction signal, the asymmetry variation ratio (ΔAsym/h(%/μm)), the output voltage ($V_{out}$) of the magnetic head, and the peak half-width ($Pw_{50\pm}$) of the pulse waveform were measured. The measured results are shown in FIGS. 11 and 12.

Figure 11:
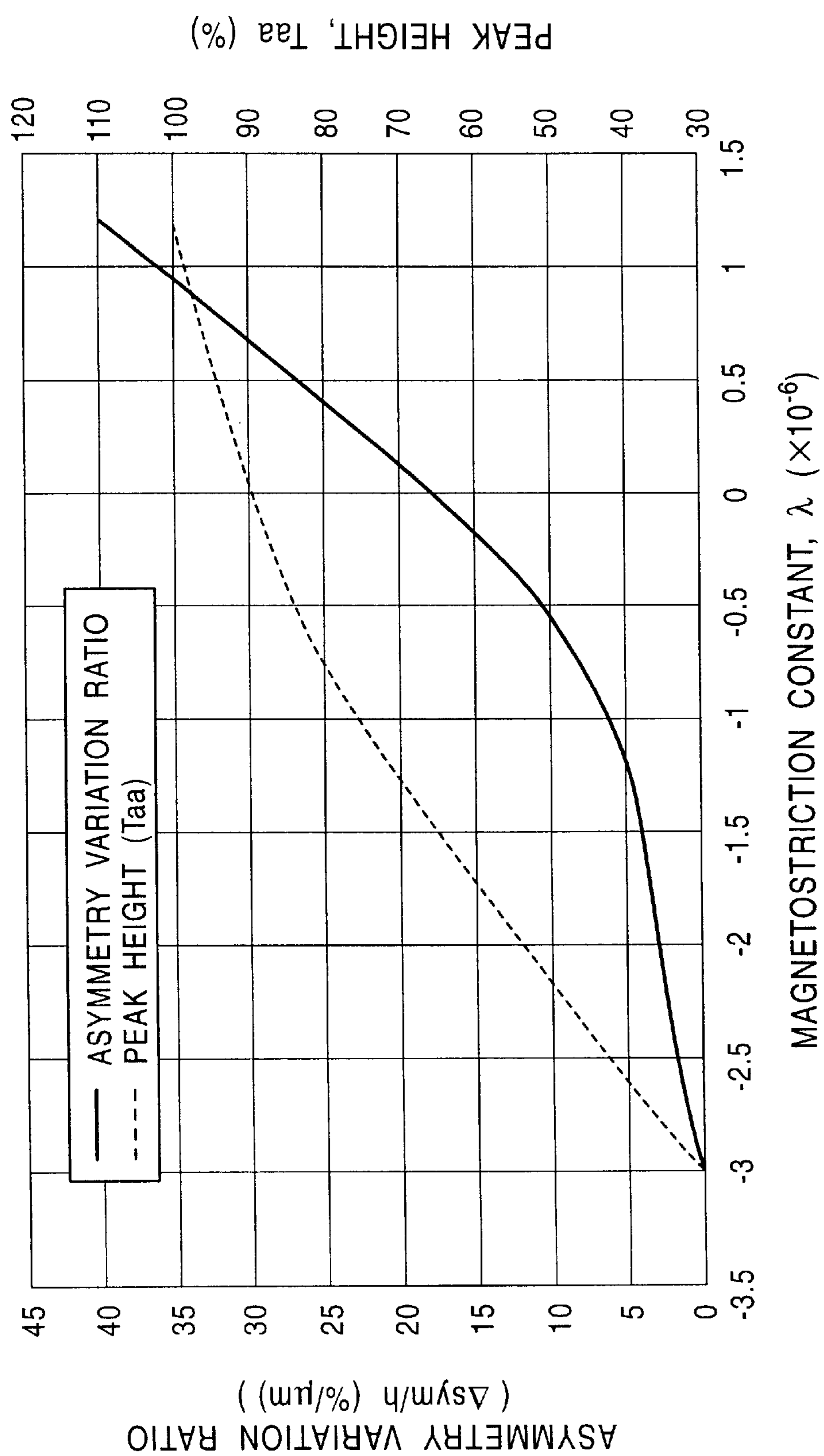
FIG. 11 is a graph showing the dependency of the asymmetry variation ratio and the peak height of pulse waveform of a reproduction signal upon the magnetostriction constant.
Figure 12:
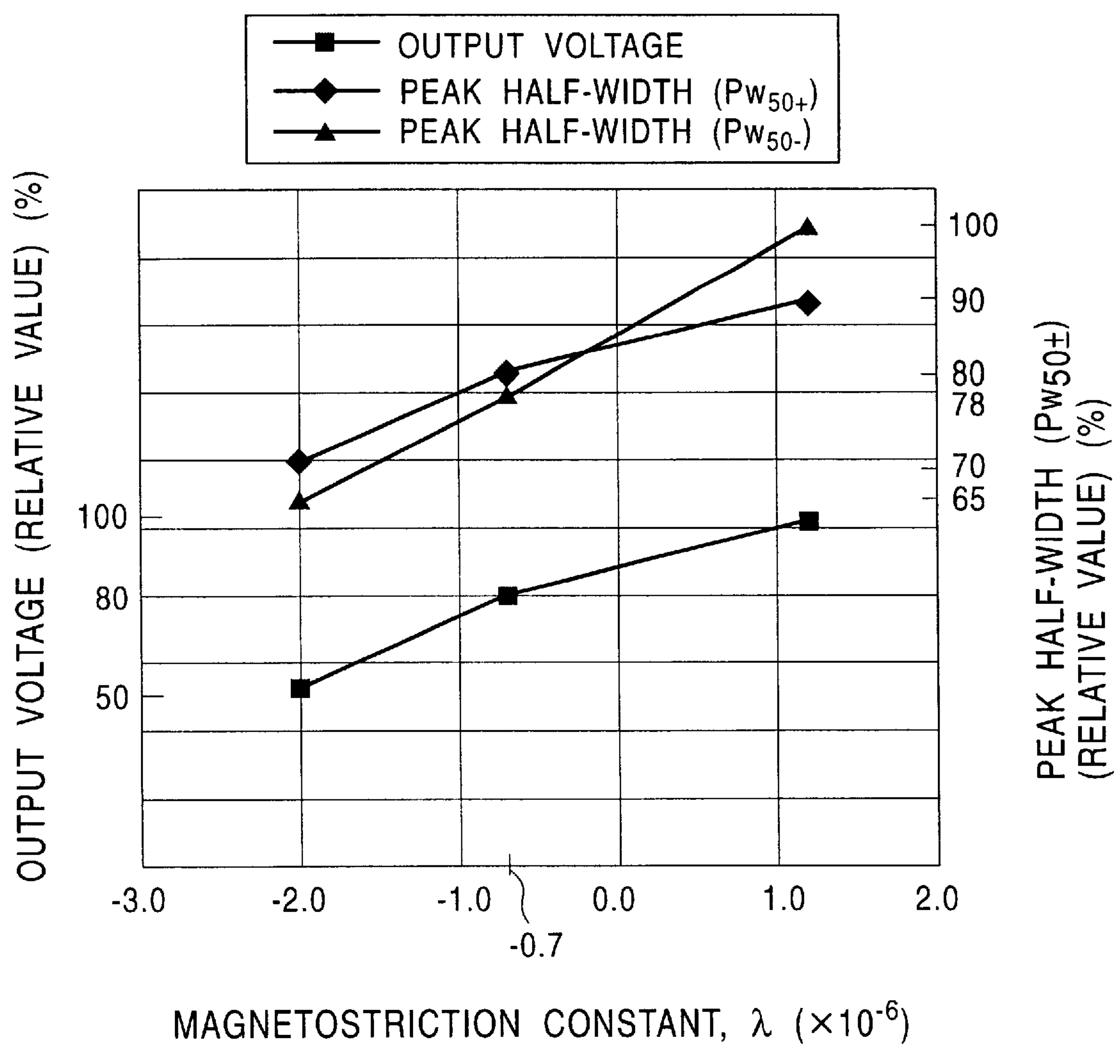
FIG. 12 is a graph showing the dependency of the output voltage of the magnetic head and the peak half-width of pulse waveform of a reproduction signal upon the magnetostriction constant.
Figure 13:
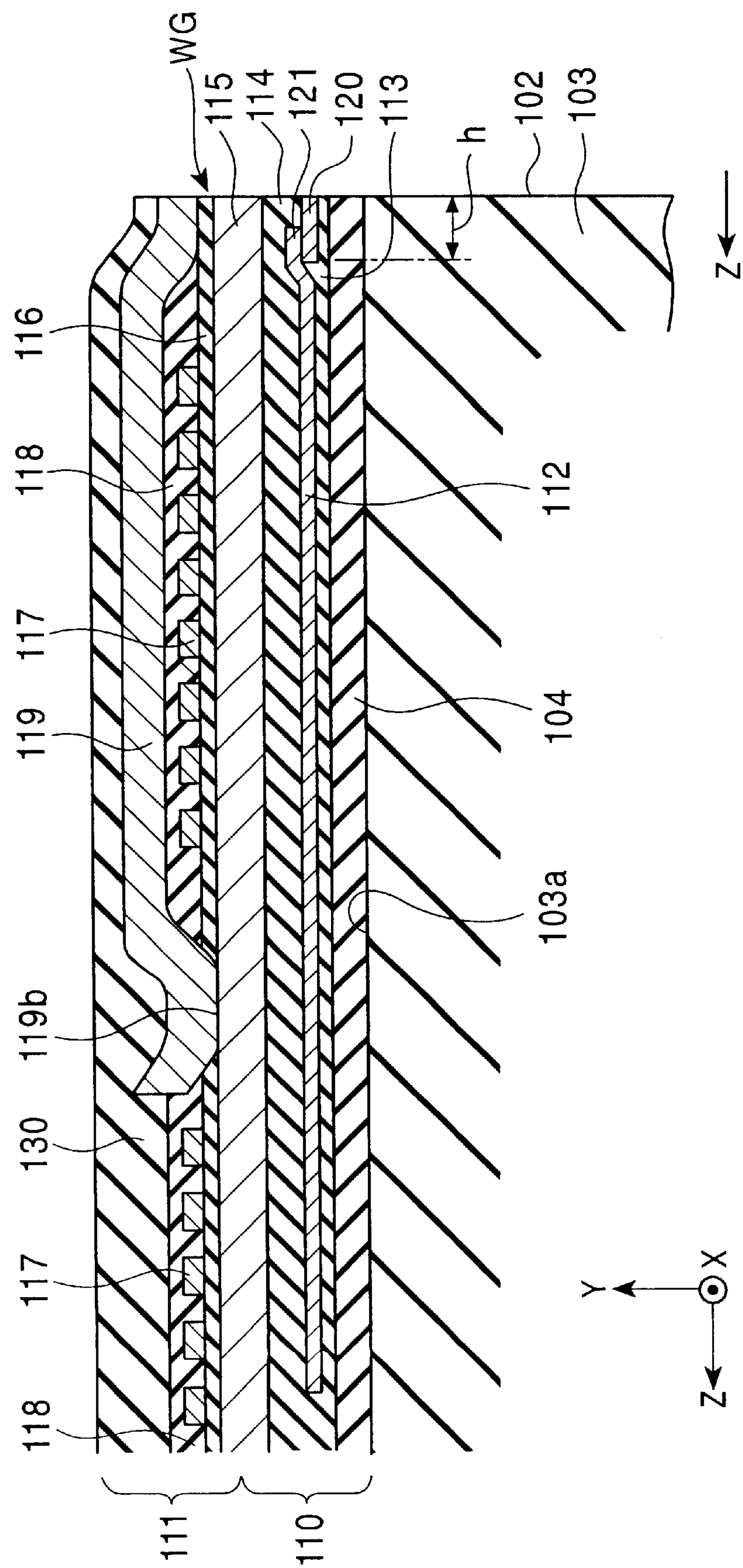
FIG. 13 is a sectional view showing a principal part of a conventional magnetic head.

FIG. 11 shows the dependency of the peak height (±Taa) and the asymmetry variation ratio (ΔAsym/h(%/μm)) upon the magnetostriction constant. Note that, in FIG. 11, the peak height (±Taa) and the asymmetry variation ratio are represented in relative values.

As shown in FIG. 11, when the magnetostriction constant is $1\times10^{-6}$, the asymmetry variation ratio is about 38%, but when the magnetostriction constant is 0 or below, the asymmetry variation ratio is about 18% or below. Thus, as the magnetostriction constant is reduced, the asymmetry variation ratio is correspondingly reduced.

Likewise, the peak height is also reduced as the magnetostriction constant is reduced. More specifically, when the magnetostriction constant is $-3\times10^{-6}$, the peak height is about 30%.

It is apparent from FIG. 11 that with a reduction in the magnetostriction constant, the asymmetry variation ratio is reduced and the amount of change in asymmetry with respect to the MR height becomes smaller.

Further, the peak height shown in FIG. 11 corresponds to the magnitude of reproduction output of the magnetic head. As the magnetostriction constant is reduced, the peak height is also reduced, i.e., it is changed in a direction that is not desired from the viewpoint of reproduction characteristics of the magnetic head. However, when the magnetostriction constant is in the range not less than $-3\times10^{-6}$, the peak height is not lower than 30%. A peak height on this order is a value at which no significant problems occur from the viewpoint of the reproduction characteristics of the magnetic head.

FIG. 12 shows the dependency of the output voltage ($V_{out}$) of the magnetic head and the peak half-width ($Pw_{50\pm}$) of the pulse waveform upon the magnetostriction constant. Note that, in FIG. 12, the output voltage ($V_{out}$) of the magnetic head and the peak half-width ($Pw_{50\pm}$) of the pulse waveform are represented in relative values on an assumption that those values of a conventional magnetic head having the magnetostriction constant of $1.2\times10^{-6}$ are each 100%.

Also, $Pw_{50+}$ represents a peak half-width of the pulse waveform of a reproduction signal projecting to the positive side, and $Pw_{50-}$ represents a peak half-width of the pulse waveform of a reproduction signal projecting to the negative side.

As shown in FIG. 12, as the magnetostriction constant is reduced, the output voltage ($V_{out}$) of the magnetic head is reduced and therefore the reproduction output is also reduced. More particularly, in the magnetic head of the present invention in which the magnetostriction constant is $-2\times10^{-6}$, the output voltage is lowered to 50% of that obtained by the conventional magnetic head having the magnetostriction constant of $1.2\times10^{-6}$.

Further, it is understood that as the magnetostriction constant is reduced, both of $Pw_{50+}$ and $Pw_{50-}$ are also reduced and the width of each pulse waveform is narrowed. In addition, as the magnetostriction constant is reduced, the difference between $Pw_{50+}$ and $Pw_{50-}$ is reduced. Particularly, when the magnetostriction constant is not more than $-0.5\times10^{-6}$, the difference between $Pw_{50+}$ and $Pw_{50-}$ is substantially negligible.

It is thus apparent from FIG. 12 that with a reduction in the magnetostriction constant, the output voltage of the reproduction signal and the width of each pulse waveform thereof are both reduced, whereby the probability of an interference between adjacent pulse waveforms is lowered. This indicates that the detecting resolution in reading by the magnetic head is improved.

A fall of the output voltage signifies a fall of the reproduction output from the magnetic head. In the magnetic head of the medium sliding type according to the present invention, however, an approximately 50% fall of the output voltage does not result in a significant fall of the reproduction signal in terms of S/N ratio. Such a fall of the output voltage is allowable from the point of providing another noticeable advantage of an improvement in the detecting resolution, which has not been previously provided.

From the above-described results, the following is understood. The magnetostriction constant of the MR device 20 is required to be 0 or below to keep the amount of change in asymmetry small. The magnetostriction constant thereof is required to be not less than $-3\times10^{-6}$ and not more than 0 to keep the amount of change in asymmetry small while preventing the reproduction output from lowering excessively. The magnetostriction constant thereof is required to be not less than $-3\times10^{-6}$ and not more than $-0.5\times10^{-6}$ to keep the amount of change in asymmetry small and improve the detecting resolution while preventing the reproduction output from lowering excessively.

Also, the following is understood from FIG. 10. The composition ratio of Fe in a Ni—Fe alloy is required to be 18.8% by weight or below for setting the magnetostriction constant of the MR device 20 to be 0 or below. The Fe composition ratio is required to be not smaller than 17.5% by weight and not larger than 18.8% by weight for setting the magnetostriction constant thereof to be not less than $-3\times10^{-6}$ and not more than 0. The Fe composition ratio is required to be not smaller than 17.5% by weight and not larger than 18.5% by weight for setting the magnetostriction constant thereof to be not less than $-3\times10^{-6}$ and not more than $-0.5\times10^{-6}$.

According to the magnetic head of the present invention, as described above in detail, since the magnetostriction constant of a magnetoresistive device is set to be 0 or below, the amount of change in asymmetry (i.e., symmetry in peak heights of a reproduction signal) with respect to the MR height is reduced. Therefore, even when the MR height is slightly changed, the asymmetry does not vary significantly. As a result, the occurrence of read errors can be prevented and better reproduction characteristics can be obtained.

Further, by setting the magnetostriction constant of the magnetoresistive device to be 0 or below, the detecting resolution of the magnetic head is improved so as to be adaptable for a higher frequency of a recording signal. Hence, the magnetic head of the present invention is sufficiently adaptable for an increase in magnetic recording density.

What is claimed is:

1. A magnetic head comprising a magnetoresistive reading device for reproducing a magnetic signal recorded on a magnetic recording medium while contacting said recording medium, said magnetoresistive reading device having a height h in a direction perpendicular to a track width direction of the magnetic recording medium and formed of a soft magnetic substance having a magnetostriction constant of 0 or below, and wherein the reproduced magnetic signal is characterized by a negligible asymmetry in its waveform, and said negligible asymmetry does not vary significantly when the magnetoresistive reading device height h is slightly altered.

2. The magnetic head as in claim 1, wherein the signal waveform asymmetry is represented by a difference in the heights of the waveform peaks, ±Taa and the asymmetry, Asym(%), is computed as follows:

$$\text{Asym}(\%)=[((+Taa)-(-Taa))/((+Taa)+(-Taa))]\times100.$$

3. The magnetic head as in claim 2, wherein an asymmetry variation ratio, ΔAsym(%)/h (%/μm), representing an amount of change in the signal waveform asymmetry as the magnetic device height h varies, is preferably held down to not more than 30 (%/μm).

4. The magnetic head according to claim 2, wherein said soft magnetic substance is a Ni—Fe alloy and a composition ratio of Fe in said Ni—Fe alloy is in a range of not smaller than 17.5% by weight and not larger than 18.8% by weight.

5. The magnetic head as in claim 1, wherein a difference between peak half-widths of the signal waveform, $Pw_{50+}$ and $Pw_{50-}$, corresponding to positive and negative waveform sides respectively, is reduced in the reproduction of the recorded magnetic signal.

6. The magnetic head according to claim 5, wherein the magnetostriction constant of said soft magnetic substance is in a range of not less than $-3\times10^{-6}$ and not more than $-0.5\times10^{-6}$.

7. The magnetic head according to claim 1, wherein the magnetostriction constant of said soft magnetic substance is in a range of not less than $-3\times10^{-6}$ and not more than $-0.5\times10^{-6}$.

8. The magnetic head according to claim 7, wherein said soft magnetic substance is a Ni—Fe alloy and a composition ratio of Fe in said Ni—Fe alloy is in a range of not smaller than 17.5% by weight and not larger than 18.5% by weight.

9. A magnetic head including two or more magnetoresistive devices as reading devices, for reproducing a magnetic signal recorded on a magnetic recording medium while contacting said recording medium, having each a corresponding height h in a direction perpendicular to a track width direction of the magnetic recording medium and formed of a soft magnetic substance having a magnetostriction constant of 0 or below, and wherein the reproduced magnetic signal is characterized by a negligible asymmetry in its waveform, and said negligible asymmetry does not vary significantly when the corresponding magnetoresistive reading devices heights h are slightly altered.

10. The magnetic head according to claim 9, wherein the the corresponding heights h of the magnetoresistive devices are preferably equal as to insure that the signals reproduced by each magnetoresistive device are identical to each other.

11. The magnetic head according to claim 9, wherein the magnetostriction constant of said soft magnetic substance is in a range of not less than $-3\times10^{-6}$ and not more than 0.

12. The magnetic head according to claim 9, wherein the magnetostriction constant of said soft magnetic substance is in a range of not less than $-3\times10^{-6}$ and not more than $-0.5\times10^{-6}$.

* * * * *

UNITED STATES PATENT AND TRADEMARK OFFICE

CERTIFICATE OF CORRECTION

PATENT NO. : 6,633,460 B2
DATED : October 14, 2003
INVENTOR(S) : Tsutomu Takeya

It is certified that error appears in the above-identified patent and that said Letters Patent is hereby corrected as shown below:

Column 14,
Line 11, delete "$-0.5x10^{-6}$." and substitute -- 0. -- in its place.

Signed and Sealed this

Sixteenth Day of March, 2004

JON W. DUDAS
*Acting Director of the United States Patent and Trademark Office*